United States Patent
Wen et al.

(10) Patent No.: US 8,535,630 B2
(45) Date of Patent: Sep. 17, 2013

(54) METHOD AND APPARATUS FOR SOX AND $CO_2$ REMOVAL FROM FLUE GAS

(71) Applicant: Bechtel Power Corporation, Frederick, MD (US)

(72) Inventors: Harvey Wen, Boyds, MD (US); Charles L. Kimtantas, Sugar Land, TX (US)

(73) Assignee: Bechtel Power Corporation, Frederick, MD (US)

( * ) Notice: Subject to any disclaimer, the term of this patent is extended or adjusted under 35 U.S.C. 154(b) by 0 days.

(21) Appl. No.: 13/670,142

(22) Filed: Nov. 6, 2012

(65) Prior Publication Data

US 2013/0129591 A1    May 23, 2013

Related U.S. Application Data

(60) Provisional application No. 61/628,823, filed on Nov. 7, 2011.

(51) Int. Cl.
*B01D 53/50* (2006.01)
*B01D 53/62* (2006.01)
*C01B 17/60* (2006.01)
*C01B 31/20* (2006.01)

(52) U.S. Cl.
USPC .......... 423/220; 423/242.1; 423/244.01; 423/244.07; 423/539

(58) Field of Classification Search
USPC ............ 423/220, 242.1, 244.01, 244.07, 423/539
See application file for complete search history.

(56) References Cited

U.S. PATENT DOCUMENTS

| | | | | |
|---|---|---|---|---|
| 4,110,087 | A * | 8/1978 | Nolley, Jr. | 95/179 |
| 6,737,031 | B2 * | 5/2004 | Beal et al. | 423/230 |
| 7,416,716 | B2 * | 8/2008 | Allam et al. | 423/437.1 |

* cited by examiner

*Primary Examiner* — Timothy Vanoy
(74) *Attorney, Agent, or Firm* — Duane Morris LLP

(57) ABSTRACT

The present invention relates to a method for combined $SO_2$ and $CO_2$ removal from flue gas, which includes removing both $CO_2$ and $SO_2$ in a primary fractionation column and two polishing columns, the method comprising: a) hot flue as pretreatment, including flue gas $SO_3$ removal by dry sorbent injection; b) compressing the treated hot flue gas by a multi-stage compressor; c) separation of $CO_2$, $SO_2$ and non-condensable gases; d) subjecting the $CO_2$ and $SO_2$ to separate polishing columns; and e) combining streams from the primary fractionation column and the two polishing columns for power recovery.

14 Claims, 4 Drawing Sheets

METHOD AND APPARATUS FOR SOX AND CO$_2$ REMOVAL FROM FLUE GAS

CROSS REFERENCE TO RELATED APPLICATION

This application claims the benefit of U.S. Provisional Patent Application No. 61/628,823 filed Nov. 7, 2011.

FIELD OF THE INVENTION

The present invention provides a method to remove sulfur oxides and carbon dioxide from oxyfuel combustion power plants.

BACKGROUND OF THE INVENTION

The combustion of fossil fuel produces a flue gas with dilute SO$_2$ and CO$_2$ which are difficult to remove in a single removal process. The incumbent technology for their removal is to remove SO$_2$ with a flue gas desulfurization (FGD) process and then remove CO$_2$ with a solvent scrubbing. The FGD process requires the use of a reagent such as limestone slurry, and it generates a waste product such as calcium sulfate that needs to be disposed offsite. The current technology for capturing CO$_2$ from the flue gas is by solvent scrubbing. Many solvents are under development, including amines that are tolerant to the impurities in coal fired boiler flue gas as well as low in solvent regeneration energy. Current solvent technology requires substantial amount of steam to regenerate the spent solvent for recycle, and this can reduce the power plant output by as much as 25%.

Another method to capture CO$_2$ from flue gas is the use of oxyfuel combustion. In an oxyfuel combustion boiler, fossil fuel (coal, oil or gas) is combusted using a high purity oxygen, generally 95% oxygen or higher. This method of combustion reduces the amount of nitrogen in the flue gas, thus facilitating carbon dioxide capture. The flue gas volume from an oxy combustion boiler is about only 25% that of an air fired boiler of the same size. The flue gas is first cooled to recover moisture in the flue gas. The dried oxyfuel flue gas contains about 90% of CO$_2$ compared to about 14% for an air-fired boiler flue gas. The use of oxyfuel combustion eliminates the need for a CO$_2$ concentrating process such as an amine plant.

The generic oxy-combustion process under development by the power industry is generally comprised of a wet flue gas desulfurization (FGD) unit for SO$_2$ capture followed by a CO$_2$ purification unit (CPU). A portion of desulfurized gas is re-circulated back to the boiler as a modulating gas to quench the furnace temperature due to oxygen firing. The CPU is comprised a cryogenic type cooling and separation of CO$_2$ from oxygen and nitrogen gases which were infiltrated into the flue gas due to air leakage in the downstream emission control equipment.

This invention provides a method to remove SO$_2$ and CO$_2$ in a combined process rather than remove them using two separate processes. In addition, with this invention, the SO$_2$ removed is a liquid product that can be transported in vessels and is a saleable product. The CO$_2$ product purity can be controlled to meet the final product applications. The combined SO$_2$ and CO$_2$ removal process generates no desulfurization waste product, and offers a lower capital cost option for carbon capture. This process is superior to the combined SOx and CO$_2$ removal process described in U.S. Pat. No. 7,416,716 where SO$_2$ is removed as sulfuric acid rather than a liquid product. It is also superior to the process described in U.S. Pat. No. 6,737,031 where calcium based reagent is needed to capture SO$_2$.

SUMMARY OF THE INVENTION

The present invention relates to a method for combined SO$_2$ and CO$_2$ removal from flue gas, which includes removing both CO$_2$ and SO$_2$ in a primary fractionation column and two polishing columns, the method comprising: a) hot flue gas pretreatment, including flue gas SO$_3$ removal by dry sorbent injection; b) compressing the treated hot flue gas by a multi-stage compressor; c) separation of CO$_2$, SO$_2$ and non-condensable gases; d) subjecting the CO$_2$ and SO$_2$ to separate polishing columns; and e) combining streams from the primary fractionation column and the two polishing columns for power recovery.

DETAILED DESCRIPTION OF THE INVENTION

In an oxyfuel combustion power plant, fossil fuel is combusted in a furnace with oxygen. The flue gas of oxyfuel combustion is comprised mainly of carbon dioxide, moisture, sulfur dioxide, and small amounts of other gases. This invention provides a method of removing moisture, sulfur oxides, and carbon dioxide with cooling, fractionation and separation of these components. Sulfur dioxide is separated and can be transported either in a gaseous or liquid form for export. Carbon dioxide is also separated and compressed for send out for either industrial use of sequestration.

Figure 1:
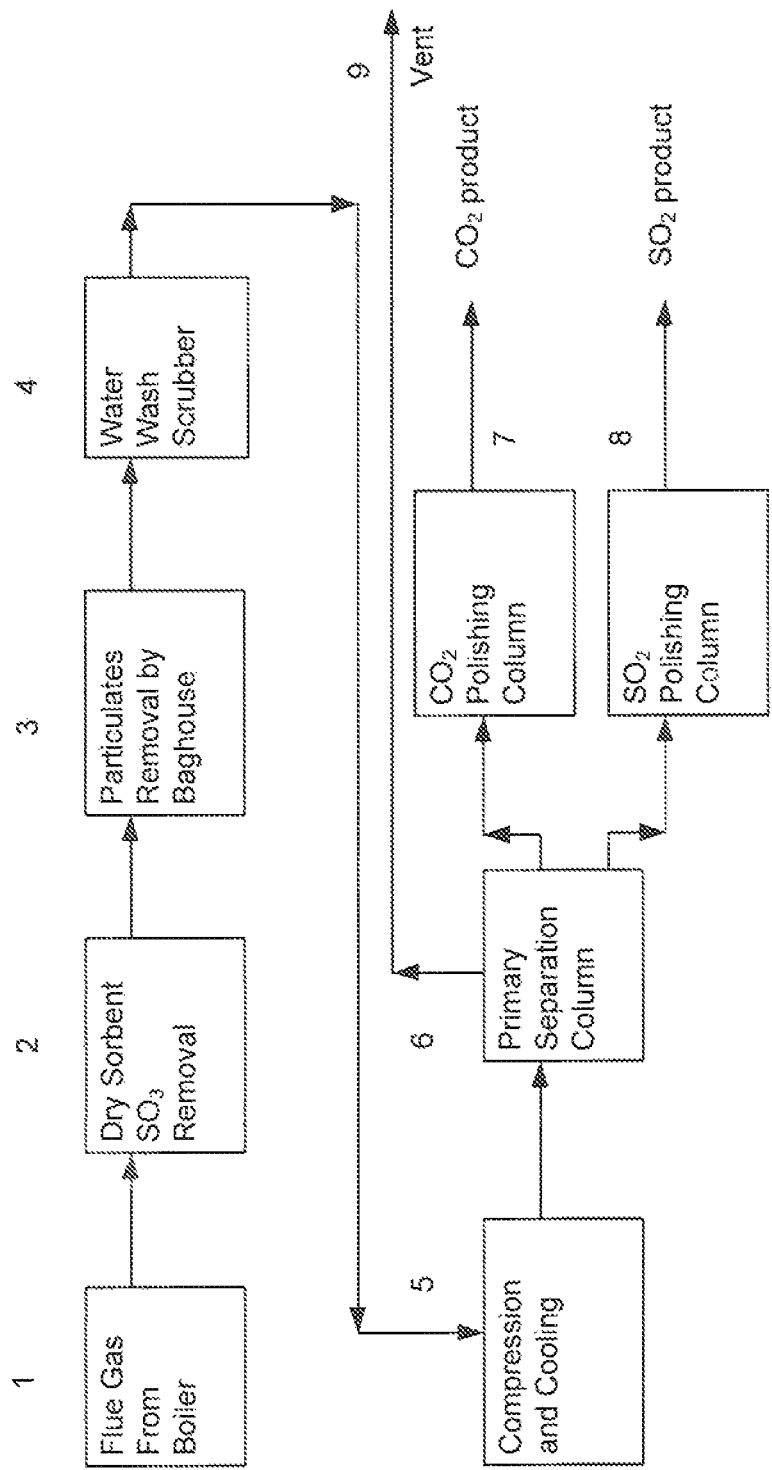
FIG. 1 is a process flow diagram for the combined removal process.

FIG. 1 is a block flow diagram for the combined SOx and CO$_2$ removal process. Hot flue gas (1) from a fossil fuel fired boiler exhaust is treated with a dry sorbent SO$_3$ removal (2) where either dry lime or Trona can be used as its reagent. After SO$_3$ removal, the particulates in the flue gas are removed by a baghouse (3). The particulate free gas is washed in a water wash column for further cleaning of trace materials and cooling in a water wash scrubber (4). After scrubbing, the washed flue gas enters a multistage compression unit which is equipped with intercoolers (5) where CO$_2$ and SO$_2$ are condensed. The condensed liquid enters the primary separation column (6) where non-condensable SO$_2$, and CO$_2$ are separated. From the primary separation column, a CO$_2$ rich stream is withdrawn for further fractionation in a polishing column (7), and a SO$_2$ rich stream is withdrawn for further fractionation in a polishing column (8). The final products are high purity SO$_2$ and CO$_2$.

The process can be divided into the following subsystems: Hot flue gas pretreatment; compression and cooling; primary separation; CO$_2$ polishing column; SO$_2$ polishing column; and power recovery Pretreatment Hot flue gas (1) pretreatment includes flue gas SO$_3$ removal by dry sorbent injection (2). Candidate sorbent is Trona, which is a commercially proven chemical for selectively removal of SO$_3$ in flue gas. SO$_3$ exists in flue gas especially if the fuel burned in the boiler is coke or heavy oil where vanadium exists in the fuel. Vanadium is a catalyst to convert $SO_2$ to $SO_3$ in the boiler. The removal of $SO_3$ reduces the formation of sulfuric acid in the flue gas downstream. After the bulk of $SO_3$ is removed, the flue gas needs to be further cleaned with a baghouse or electrostatic precipitator (3). The particulates free flue gas is then washed and cooled in a water scrubber (4). To control the acidity of the wash scrubber water, an alkali material can be added to increase its pH value and water blowdown is used to control the water quality. This pretreatment system is commercially proven and is necessary to prepare the feed gas to the combined $SO_2$ and $CO_2$ removal process.

Compression and Cooling

The treated flue gas is compressed by a multi-stage compressor with intercoolers (5) to about 680 psia. The last stage of the compressor outlet gas is chilled by refrigerant to cool the gas to below ambient temperature.

Primary Separation Column

Figure 2:
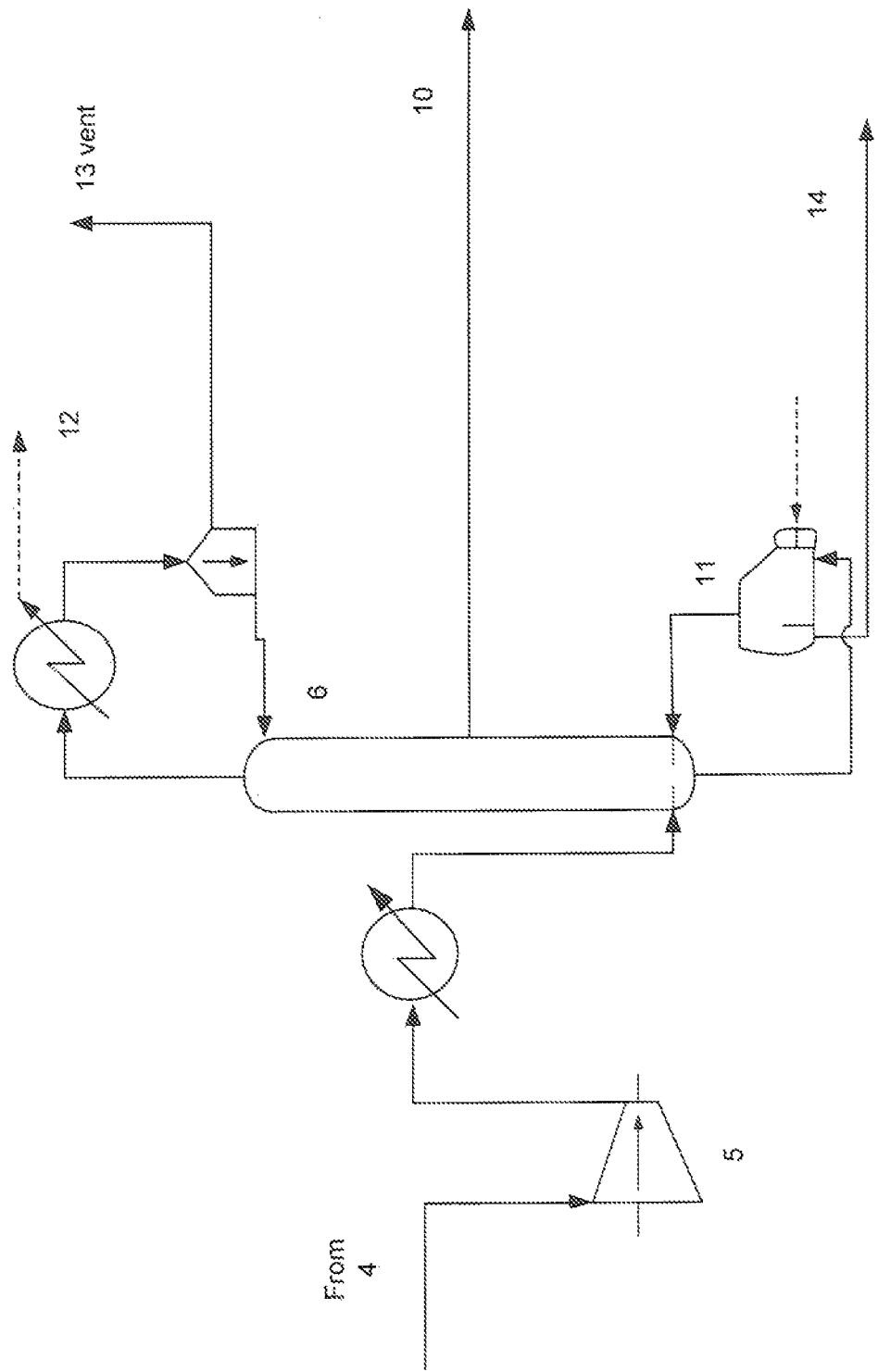
FIG. 2 shows the primary separation column configuration.

FIG. 2 shows the Primary Separation Column configuration. The chilled flue gas enters the primary separation column (6) where the primary separation of $CO_2$, $SO_2$ and non-condensable gases take place. The column is equipped with a heated reboiler (11), and a cooled reflux heat exchanger with a reflux condenser knockout drum (12). The vent gas (13) is very low in $CO_2$ and $SO_2$ and is vented through an expander (26) for power recovery. The heat supply to the reboiler is recovered from compression intercoolers and other waste heat sources.

A stream of enriched $CO_2$ (10) is withdrawn from a selected tray location. It is located near the middle of the column, but its exact location needs to be determined based on actual project flue gas composition. The $CO_2$ rich stream (10) is sent to the $CO_2$ polishing column (7).

A stream of enriched $SO_2$ (14) is withdrawn from the reboiler through its weir well. It is sent to the $SO_2$ polishing column (8).

If a coal fired boiler flue gas is used as the feed gas, the primary separation column can perform a 78% (by weight) $CO_2$ recovery, and 99% (by weight) $SO_2$ recovery.

$CO_2$ Polishing Column

Figure 3:
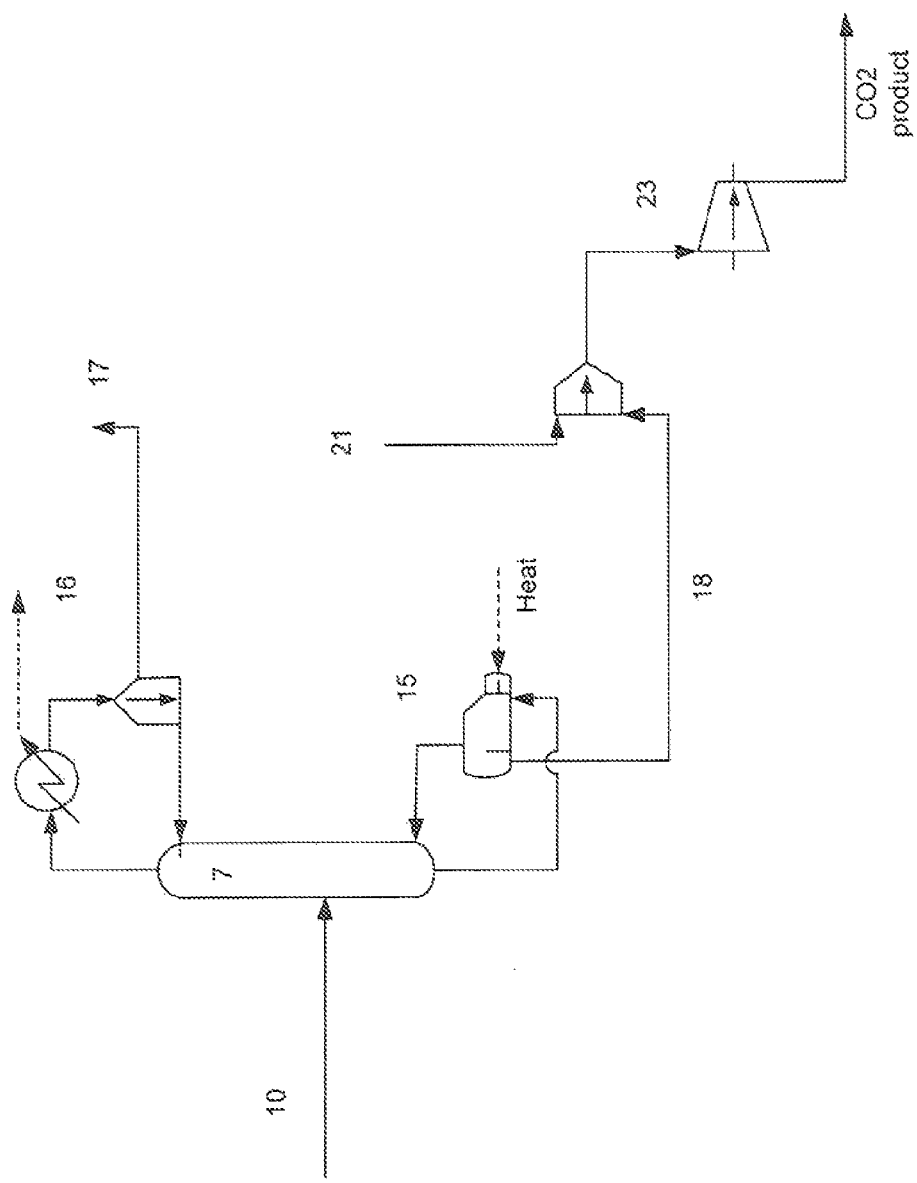
FIGS. 3 and 4 show the CO$_2$ and SO$_2$ columns, respectively.

FIG. 3 shows the $CO_2$ column. The $CO_2$ polishing column (7) is comprised of a reboiler and a refrigeration cooled reflux cooler, with a knock out drum (16). The heat supply for the reboiler (15) is recovered low level waste heat from the power plant. The reflux vent (17) is comprised of mainly non-condensable gases, and is combined with vents from other columns and sent to an expander (26) for power recovery. The high purity $CO_2$ product (18) is withdrawn from the reboiler weir well and mixed with the $CO_2$ stream from the $SO_2$ column reflux overhead condensate line (21) and sent to a compressor (23) to increase its send-out pressure.

$SO_2$ Polishing Column

Figure 4:
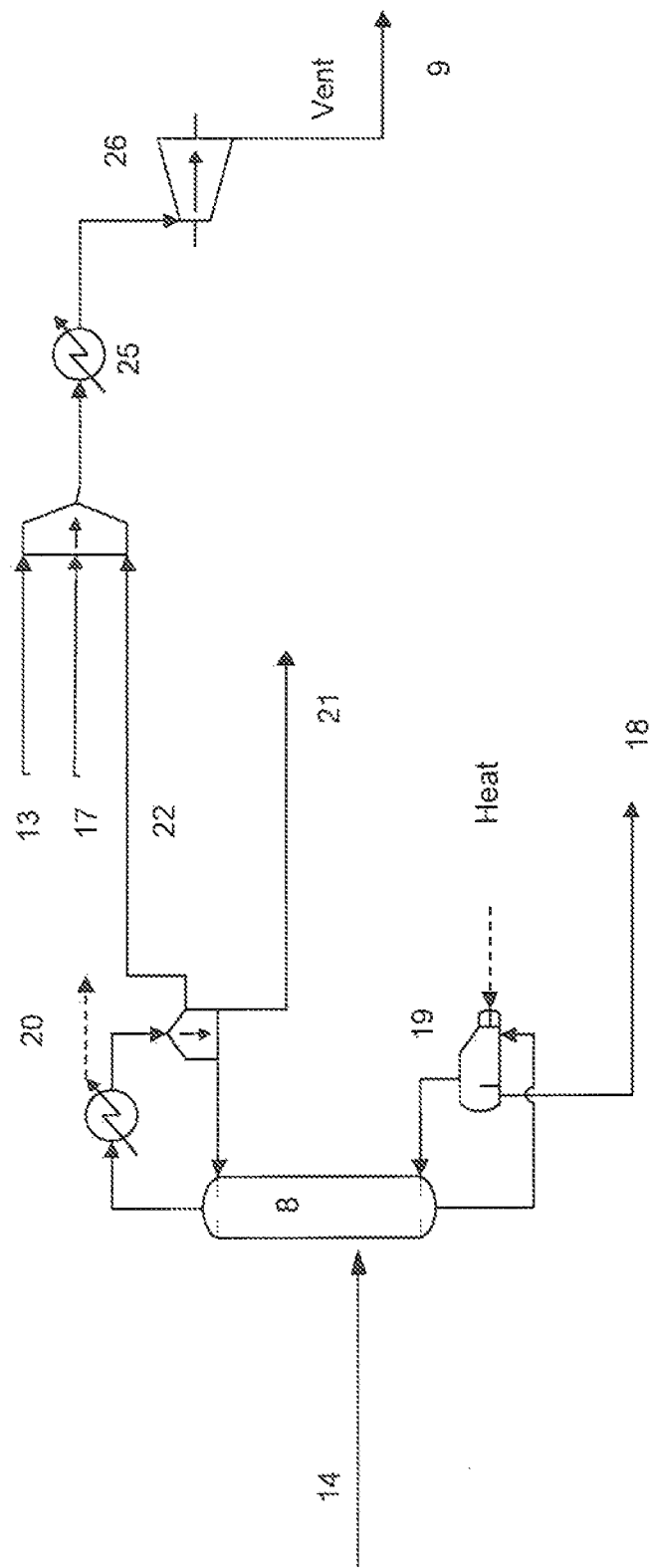

FIG. 4 shows the $SO_2$ column. The $SO_2$ polishing column (8) is comprised of a reboiler and a refrigeration cooled reflux cooler with a knock out drum (20). The heat supply for the reboiler (19) is a recovered low level waste heat from the power plant. The reflux overhead vent (22) is vented to an expander train (26), and the reflux condensate (21) is comprised mainly of $CO_2$ and is combined with Stream (18) and sent to the $CO_2$ product compressor (23).

Power Recovery

Vent gas streams from all columns are high pressure gases. Stream (13) vent from the primary column, stream (17) from the $CO_2$ polishing column, and stream (22) from $SO_2$ polishing column are combined and heated in a heater (25), and then sent to an expander (26) for power recovery before final venting.

Performance

Table 1 below shows the gas composition and removal efficiencies for both $CO_2$ and $SO_2$. The Feed Gas composition used is based on a DOE/NETL study No. 2007/1291, Revision 2 dated August 2008, entitled "Pulverized Coal Oxycombustion Power Plants". The reference power plant is a coal fired power plant burning an Eastern Bituminous coal. It has a power output of 550 MW. As shown in the table, the computer simulated removal efficiency is about 93.92% for $CO_2$ capture, and 99.96% for $SO_2$ capture.

TABLE 1

$CO_2$ and $SO_2$ Removal Efficiencies

|  |  | Feed Gas | $CO_2$ Product | $SO_2$ Product |
|---|---|---|---|---|
| Temp | F | 350 | 75.3 | 120 |
| Pressure | psia | 14.2 | 2,530 | 150 |
| Ar | lb/hr | 50,745 | 2,175 | 0 |
| CO2 | lb/hr | 1,283,533 | 1,199,478 | 264 |
| H2O | lb/hr | 283,918 | 1 | 324 |
| N2 | lb/hr | 96,439 | 2,764 | 0 |
| O2 | lb/hr | 24,892 | 1,107 | 0 |
| SO2 | lb/hr | 27,280 | 11.5 | 27,270 |
| Total | lb/hr | 1,766,807 | 1,205,536 | 27,858 |
| Removal eff. | % |  | 93.92% | 99.96% |

What is claimed is:

1. A method for combined $SO_2$ and $CO_2$ removal from flue gas, which includes removing both $CO_2$ and $SO_2$ in a primary fractionation column and two polishing columns, the method comprising:
    a) hot flue gas pretreatment, including flue as $SO_3$ removal by dry sorbent injection;
    b) compressing the treated hot flue gas by a multi-stage compressor;
    c) separation of $CO_2$, $SO_2$ and non-condensable gases;
    d) subjecting the $CO_2$ and $SO_2$ to separate polishing columns; and
    e) combining streams from the primary fractionation column and the two polishing columns for power recovery.

2. The method as recited in claim 1, wherein the $SO_2$ removed is a liquid product.

3. The method as recited in claim 1, wherein the combined $SO_2$ and $CO_2$ removal process generates no desulfurization waste product.

4. The method as recited in claim 1, wherein flue gas $SO_3$ removal is by dry sorbent injection.

5. The method as recited in claim 4, wherein the sorbent is dry lime or trona.

6. The method as recited in claim 1, wherein after $SO_3$ is removed, flue gas is further cleaned with a baghouse or electrostatic precipitator.

7. The method as recited in claim 6, wherein the particulates-free flue gas is washed and cooled in a water scrubber.

8. The method as recited in claim 7, further including an alkali material.

9. The method as recited in claim 1, wherein the treated flue gas is compressed to about 680 psia.

10. The method as recited in claim 1, wherein the separation of $CO_2$, $SO_2$ and non-condensable gases is by a primary separation column.

11. The method as recited in claim 10, wherein a coal fired boiler flue gas is used as the feed gas.

12. The method as recited in claim 11, wherein the primary separation column performs a 60% to 80% by weight $CO_2$ recovery, and a 95% to 100% by weight $SO_2$ recovery.

13. The method as recited in claim 1, wherein the polishing columns include a reboiler and a refrigeration cooled reflux cooler with a knock out drum.

14. The method as recited in claim 12, wherein the primary separation column performs a 78% by weight $CO_2$ recovery, and a 99% by weight $SO_2$ recovery.

* * * * *